US009459939B2

(12) United States Patent
Song

(10) Patent No.: US 9,459,939 B2
(45) Date of Patent: Oct. 4, 2016

(54) IN-MEMORY APPROACH TO EXTEND SEMANTIC EVENT PROCESSING WITH DOMAIN INSIGHTS

(71) Applicant: Yuqian Song, Dublin (IE)

(72) Inventor: Yuqian Song, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 1 day.

(21) Appl. No.: 14/541,749

(22) Filed: Nov. 14, 2014

(65) Prior Publication Data

US 2016/0139969 A1 May 19, 2016

(51) Int. Cl.
*G06F 3/00* (2006.01)
*G06F 9/54* (2006.01)
*G06F 17/30* (2006.01)
*G06N 5/02* (2006.01)
*G06N 99/00* (2010.01)

(52) U.S. Cl.
CPC .......... *G06F 9/542* (2013.01); *G06F 17/3087* (2013.01); *G06N 5/02* (2013.01); *G06N 99/005* (2013.01)

(58) Field of Classification Search
CPC ....... G06F 9/542; G06N 5/02; G06N 99/005
USPC ............................................. 719/318; 706/45
See application file for complete search history.

(56) References Cited

U.S. PATENT DOCUMENTS

| 6,779,060 B1* | 8/2004 | Azvine ................ G06F 3/038 710/11 |
| 7,324,984 B2* | 1/2008 | Tovinkere ............ G06N 5/04 706/15 |
| 9,128,783 B1* | 9/2015 | Warlock ................ G06F 9/542 |
| 2004/0253569 A1* | 12/2004 | Deane .................... G09B 17/00 434/178 |
| 2008/0301135 A1* | 12/2008 | Alves ................ G06F 17/30442 |
| 2009/0125550 A1* | 5/2009 | Barga .................... G06F 9/542 |
| 2009/0125635 A1* | 5/2009 | Barga ................ G06F 11/0793 709/231 |
| 2009/0262131 A1* | 10/2009 | Suntinger ............ G06Q 50/34 345/619 |
| 2009/0320047 A1* | 12/2009 | Khan .................... G06F 9/542 719/318 |
| 2011/0131588 A1* | 6/2011 | Allam ................ H04L 41/0604 719/318 |
| 2012/0036397 A1* | 2/2012 | Balani .................. G06F 11/079 714/38.11 |
| 2012/0259895 A1* | 10/2012 | Neely, III .......... G06K 9/00771 707/798 |
| 2013/0262367 A1* | 10/2013 | Coldicott .............. G06Q 10/06 706/52 |
| 2014/0280228 A1* | 9/2014 | Coldicott .......... G06F 17/30616 707/748 |
| 2014/0324864 A1* | 10/2014 | Choe ................ G06F 17/30823 707/737 |

* cited by examiner

*Primary Examiner* — Phillip H Nguyen
(74) *Attorney, Agent, or Firm* — Buckley, Maschoff & Talwalkar LLC

(57) ABSTRACT

A method, medium, and system to receive an event stream, the event stream including a plurality of events, the events being semantically modeled; receive domain insights specifying a relationship between two events, the domain insights being semantically modeled and defined by a specified time limit and a comparison of event attributes using the specified time limit with a logical operator; retrieve stored representations of events referenced in the received domain insights; process the event stream, the received domain insights, and the retrieved stored events to produce a temporal processing result; and store the temporal processing result.

20 Claims, 6 Drawing Sheets

| Interval Relation | Representation | Operator |
|---|---|---|
| X before Y | X ⊢———⊣  Y ⊢———⊣ | $Y_S$ AFTER X |
| X equals Y | X ⊢———⊣  Y ⊢———⊣ | $Y_S$ WITH X, $Y_E$ WITH X |
| X meets Y | X ⊢———⊣  Y ⊢———⊣ | $Y_S$ DURING X |
| X overlaps Y | X ⊢———⊣  Y ⊢———⊣ | $Y_S$ DURING X, $Y_E$ AFTER X |
| X during Y | X ⊢———⊣  Y ⊢————————⊣ | $X_S$ DURING Y, $X_E$ DURING Y |
| X starts Y | X ⊢———⊣  Y ⊢————⊣ | $Y_S$ WITH X, $Y_E$ AFTER X |
| X finishes Y | X ⊢———⊣  Y ⊢————⊣ | $X_S$ DURING Y, $X_E$ WITH Y |

*FIG. 2*

| Domain Expertise | Description | Representation |
|---|---|---|
| X long_time_before Y | The end time of entity X happened long time before the start time of entity Y | $Y_S$ AFTER (L>500ms) $X_E$ |
| X just_overlap Y | The entity X just happens before event Y and also ends before Y | $Y_S$ AFTER (L<100ms) $X_S \wedge Y_S$ DURING $X \wedge Y_E$ AFTER $X_E$ |
| X recently_long_time_before Y | The entity X recently happens long time before entity Y | w=3000ms; $Y_S$ AFTER (L>500ms) $X_E$ |

*FIG. 3*

IN-MEMORY APPROACH TO EXTEND SEMANTIC EVENT PROCESSING WITH DOMAIN INSIGHTS

BACKGROUND

Business Intelligence (BI) systems are designed to help organizations run better by connecting people to the information they need to make better decisions. As the amount of data rapidly develops, and enterprises place ever-increasing demands on their BI systems, current data scales and complexity are increasing dramatically. In some instances prior to formal BI systems, only a small set of highly skilled people could access enterprise data, and the expertise (writing native code and SQL) they may have encoded did not scale across the organization. This is an example of how, traditional management approaches crossing core data assets involve inflexible and rigid hierarchical manager/agent formations, relying on significant human intervention and analysis, which become increasingly difficult as scale and complexity grows.

In some aspects, an increased reliance on asynchronous event-based analysis in BI systems requires more real-time, complex event processing to filter and analyze event streams to provide relevant information to users. If performed at the application level, this event processing is expensive, both in terms of the computation required and the cost of existing commercial solutions. Furthermore, heterogeneous format of event and domain expertise encoding (i.e. rules or policies) may exist in the same organization and lead to an interpretation issue across systems/data warehouses. Thus new solutions are desired to make complex event processing affordable and easy, while maintaining the expressiveness and scalability of other distributed, event-based systems. This is especially the case for semantic event processing, where the performance is a still a challenge for the real-time processing with large amount of events (i.e., big data).

BRIEF DESCRIPTION OF THE DRAWINGS

FIG. 2 is a tabular listing of temporal relationships;

FIG. 3 is a tabular listing of temporal relationships, in accordance with some embodiments;

DETAILED DESCRIPTION

Figure 1:
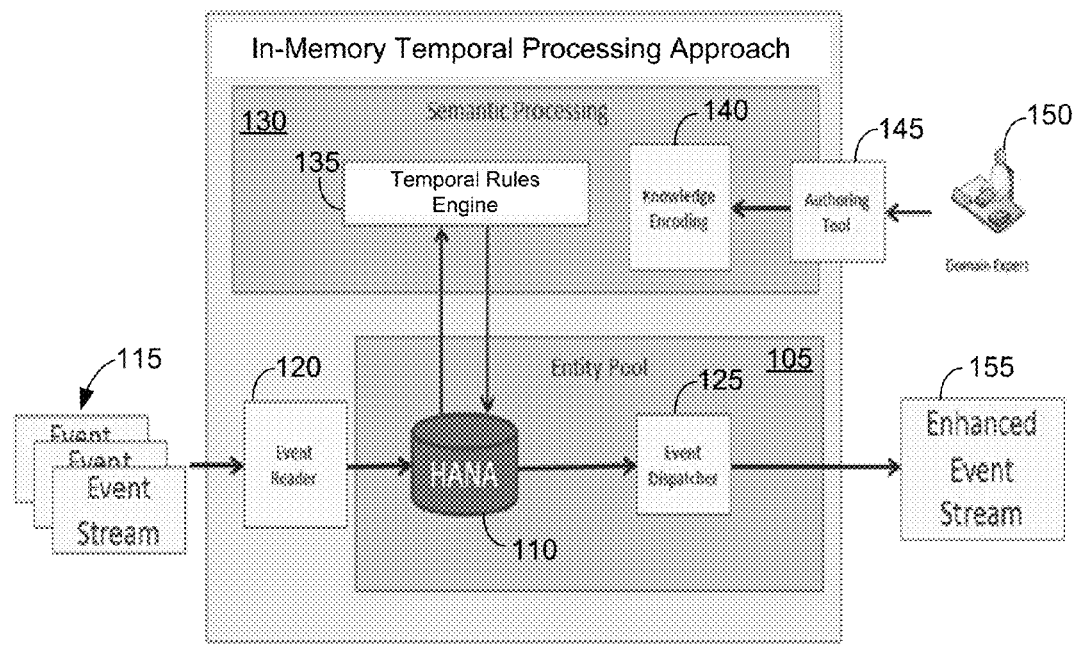
FIG. 1 is a logical depiction of a system, according to some embodiments.

FIG. 1 is a block diagram of a system or platform 100, according to some embodiments herein. System 100 represents a logical architecture for describing processes and a framework for an in-memory temporal processing approach that provides a mechanism to support complex event processing and temporal processing based on captured domain insights. Actual implementations of system 100 may include more, fewer, alternative, or different components arranged in similar or other manners than that shown in FIG. 1. In some aspects, the temporal processing herein may also be referred to as temporal reasoning.

System 100 includes an instance of an in-memory database system 110. In some embodiments, in-memory database system 110 may include SAP HANA, as provided by the assignee of the present patent application. The processes and concepts disclosed herein are not limited to any one system or technical implementation thereof. In some aspects, a plurality of events comprising an event stream 115 may be received by platform 100. The events comprising event stream 115 may be represented as semantic events. As used herein, a semantic event is an event that may refer to a variety of different occurrences, which could be gathered from or generated by different event systems. Such occurrences may include an observable occurrence, a phenomenon, an extraordinary occurrence, and the like. As used herein, the semantic events are semantically modeled using one of a semantic modeling specifications such as, for example, RDF or Resource Description Framework specification(s). Herein, an event, event(e), is included in the event stream 115 and may be defined based on semantic definitions (S) such that P={S1 ..., Sm}, where a particular instance of a semantic definition Si=(b, t1, t2), a RDF triple where event(e) happened in a period (t1, t2).

In this relationship, P is an enrichment process for a series of semantic meanings annotated or sematically encoded for each enriched concept. As an example, a semantic encoding (RDF) for an enriched concept may include the RDF triple representation of: Upselling (subject) hasSemanticConcept (property) significant_change_001 (object), where "significant_change" is the semantic encoded concept having the time stamp "t1, t2". The "significant_change" may be encoded as: significant_change_001(subject) hasTimeStamp (property) 11:00_11:15(object). Instances of this type of semantic encoding could be many and considered as a union of S for each subject (Upselling).

As used herein, an enriched concept may be a particular object such as, for example, an "Upselling" data object (i.e., a metadata object). In the present example, an instance of a semantic definition may be a "significant_change_001", that is a significant_change (b) occurring from t1 to t2. Furthermore, there may be two types of semantic definitions, a "b" type that refers to behaviours and an "s" type referring to a status. The "b" in the above relationship represents a behaviour of a particular object (e.g., an "Upselling" data object). As an example, the "Upselling" data object may be described as behaving according to a "significant change (b)" from t1 to t2. Other and/or additional semantic definitions may be described for the "Upselling" data object. A combination of the semantic definitions (i.e., behaviours/status) may be considered as an enrichment flow or union on this data object by real-time processing. In some aspects, all of the semantic definitions may be presented as RDF triples.

In some instances, the event(e) may relate to other semantic context(s), such as for example, device/system status, key performance indicators, company or business departments, etc.

Returning to FIG. 1, event stream 115 is received where event stream 115 may be formatted in RDF and include semantic attributes. As such, event stream 115 may be configured to be processed by system 100. In some aspects, event stream 115 may not be in RDF and/or may be subject to one of more (pre)processing operations (not shown) to place it in a condition to be handled by event reader 120. In some aspects, event reader 120 may perform some processing steps to (pre)condition the received event stream for further processing by system 100. In some aspects, the events may be captured "on-the-fly" has they occur in real-time. In some instances, the events may include stored events (e.g., a log of events), currently occurring events, and combinations thereof. The received and captured events may be persisted by in-memory database 110. Being an in-memory database, volatile (e.g., non-disk-based) memory (e.g., Random Access Memory) is used both for cache memory and for storing the full database. These aspects of in-memory database 110 facilitate and make it possible for the database to process the event data and domain insights herein in accordance with the disclosed processes within a requisite time interval so that the resulting temporal processing results are valid (i.e., not too old as to be obsolete for a particular context). The event stream 115 received by event reader 120 is stored in entity pool 105. Entity pool 105 may persist the events in data stream 115 and other records of events.

System 100 also includes a semantic processing component, device, system, or sub-system 130. Semantic processing component 130 includes a temporal rules engine 135 to temporally process domain insights specified by, for example, a domain expert 150. Domain expert 150 may be particularly knowledgeable of a business, company department, business process, and other contexts, processes, applications, services, systems, and combinations thereof. Authoring tool 145 may be one or a set of tools used by domain expert 150 to represent aspect(s) of the domain(s) described by the domain expert. Domain expert 150 may specify their (expert) knowledge using one or more authoring tools 145, where the authoring tools may be known or become known in the future.

Knowledge encoding component 140 may configure the domain insight knowledge authored by domain expert 145 into a format that may be further processed and understood by system 100. In some instances, knowledge encoding component 140 may operate to encode the captured domain insight(s) into Jena rule which is compatible with Jena semantic rule engine and RDF. The RDF representation of the domain insights may be provided to temporal rules engine 135. Temporal rules engine 135 may process the received domain insights from the domain expert 150 and the events received in event stream 115 to produce temporal results based thereon. The temporal rules engine may be built on the top of a semantic rule engine such as, for example the open source semantic rule engine Jena that is an open-source semantic-web framework for Java that includes a number of different semantic-reasoning modules. However, Jena is currently not able to process temporal rules for streaming event, so the temporal rules engine firstly converts the temporal operators to the rules that could be processed by Jena and then lets Jena process the reasoning and generate the result, which is also formatted in RDF. The temporal results may be stored or persisted by the in-memory database 110. The stored temporal results may be temporary or intermediate results that may be used in further temporal processing determinations. In some instances, the temporal result, final and in some aspects temporary results, may be provided or transmitted to an event dispatcher 125. Event dispatcher 125 may operate to dispatch or output the results of the temporal processing determination of temporal rules engine 135 in an enhanced event stream 155. The output enhanced event stream may be used in a business process as guidance, used to produce a report that provides insight to a business, etc. The output of the enhanced event stream is referred to as such herein since, in contrast to the input event stream, the output event stream is determined based on temporal relationships between events and domain insights provided by domain expert 150. In some aspects, the temporal rules engine herein may also be referred to as a temporal reasoner.

In some aspects, temporal rules engine 135 may be pre-existing or part of a legacy system that could not typically use temporal information (e.g., timestamps associated with two events such as a past event and a current event) to compute or determine temporal processing to compare events.

In some embodiments, temporal events used herein may be converted into a format and configuration that fully captures and expresses temporal relationships between events that can be processed by a rules engine 135. Such converted semantic rules or semantic specifications may obviate a need to modify existing or design a new processor.

In some aspects, events may be described using temporal intervals, as opposed to point-based representations of events. Traditional expressions of temporal events using time intervals typically adhered to thirteen different relations that described relations between two intervals X and Y. The thirteen different relations included the seven base relations shown in the table 200 of FIG. 2 and their corresponding inverses for a total of thirteen. FIG. 2 lists seven interval relations at 205, a graphical representation at 210, and an operational representation at 215. The disclosed intervals can be described based on a comparison of their start and stop times where XS represent the start of X and XE represents the end of X. The intervals of FIG. 2 may be viewed as relating to comparing a single time stamp, either the start or stop time of one interval, to another interval. This type of view can be used to represent the seven interval relationships of FIG. 2, 205 using three operators representing the relationship of a point P (either start or stop) to an interval X and represented numerically. The three operators are AFTER, WITH, and DURING and are used in the expressions 215.

It is noted that the expressions 205 and 215 represent point-based algebra. However, real-world events do not necessarily correspond to explicit beginnings and endings as represented by the expressions of FIG. 2. Real-world events may not have clearly defined start and end points, particularly relative to other events. While the point-based interval relations of 205 are translated into numeric expressions as shown at 215, they are limited in their ability to fully and/or accurately capture and express temporal relationships and events.

In some embodiments, temporal events and relationships may be captured and expressed, for example, by the encoding of expressed expert insights, in accordance with some enhanced or extended temporal expressions and concepts herein. For any arbitrary two events, X and Y, all temporal relationships may be represented using three operators. The operators include a DURING operator, an AFTER operator, and a WITH operator. The DURING operator specifies one event happens within the period of the other event happening. The AFTER operator states that one event happens after the other and the WITH operator states that the two events start and stop at the same time. In some aspects, these three operators may be generalized by operators DURING, AFTER(L), and FILTER(OP,L), where L is a time limit and the filter is for comparing any arbitrary attributes using an arbitrary logical operator with the time limit L. In some aspects herein, the domain experts may use the three logical operators to express complex insights for semantic meaningful entities.

FIG. 3 is a tabular listing 300 that illustrates some examples of the expressiveness of the three operators used in combination with the time limit and filter disclosed herein. Column 305 lists a domain expert's domain expertise. For example, the domain expert may specify "X long- _time_before Y" that means "the end of time of entity X happened long time before the start time of entity Y" as shown in column 210. This particular expression may be represented numerically, as shown at column 315, as "Ys AFTER (L>500 ms) Xe", where s denotes start and e denotes end.

As illustrated by FIG. 3, the three basic operators combined with the specified time limit L may be used by domain experts to define more complex and varied operations, as compared to the table of FIG. 2. In some aspects, a "window" parameter, w, is introduced herein that represents a time limit of tracing back the historical entities maintained in the entity pool (e.g. 105) herein. In some aspects, the three expert-defined operators are available for logical representation in the definition of basic semantic attributes and semantic segments herein. The temporal processing has, in some aspects, a capability of interpreting heterogeneous domain knowledge by rephrasing the logical representation into formal rules.

In some embodiments, in an effort to store historical events for future comparison using the proposed temporal operators herein, the entity pool component 105 of system 100 is used to maintain the events. Entity pool component 105 allows and provides for the storing, retrieving, and analyzing of events as the events are processed by system 100. The in-memory database of the system provides a mechanism that ensures the performance of the entity pool.

In some embodiments, entity pool 105 performs three major functions. The functions include storing (including updating) of uniquely-identifiable event publications in a persistent data store (e.g., SAP HANA). The functions also include the retrieving of specific events for inspection by the system and the checking of events to determine whether the data store contains information about any events that match a particular semantic- or content-based subscription filter containing other arbitrary constraints (such as, for example, checking the value of certain attributes).

In some embodiments, with respect to performance, the in-memory database data store iterates over all of the events that initially match the time constraints provided by the temporal operators. This implies that the time taken to process each operator should grow as more event publications are retrieved from the data store (e.g., 110) to check stored historical events against the currently processed event (up to the limit L specified in the operators themselves). Thus, it is feasible to implement system 100 such that the processing time grows no worse than linearly with the number of events returned from the data store.

Figure 4:
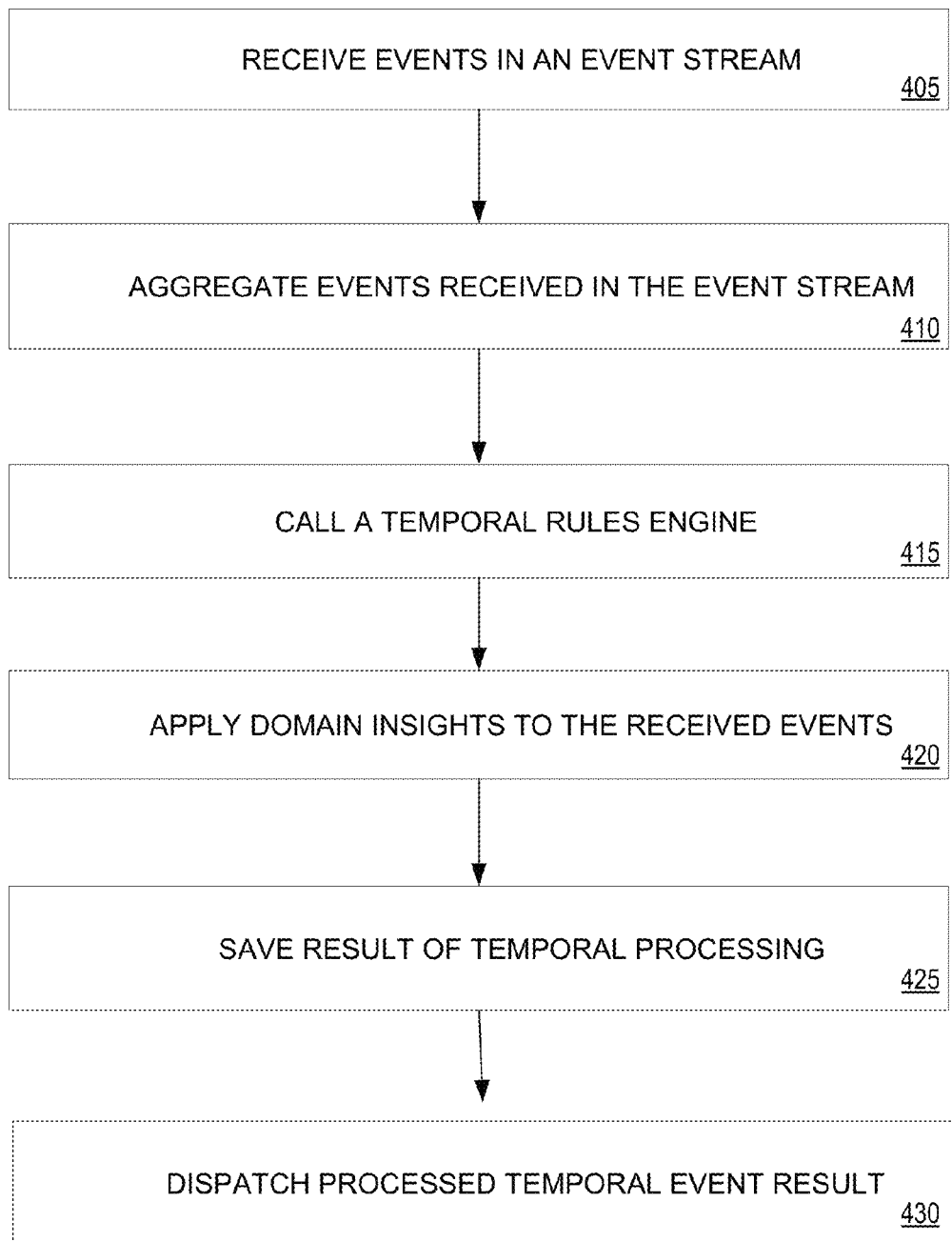
FIG. 4 is a flow diagram of a process, in accordance with some embodiments.

FIG. 4 is a flow diagram of a process 400 that includes a number of operations that may be implemented by, for example, system 100. Process 400 may be implemented by a system, application, or apparatus configured to execute the operations of the process. In some embodiments, various hardware elements of system 100 execute program instructions to perform process 400. In some embodiments, hard-wired circuitry may be used in place of, or in combination with, program instructions for implementation of processes according to some embodiments. Embodiments are therefore not limited to any specific combination of hardware and software.

Prior to operation 405, a program executing on a device or a server-side computing device (e.g., an application server) may be developed and deployed to one or more device(s) to implement process 400. That is, process 400 may comprise a portion or part of a larger or different process.

At operation 405, an event stream is received. The event stream comprises a plurality of semantically modeled events. In some embodiments, the events are represented as RDF expressions of the events. The events may encompass any number and variety of occurrences, including but not limited to transactional events, log entries, etc. The events may include real-time occurrences that are captured on the fly as they occur. Processing by an in-memory database may be more than sufficient and well-suited for the real-time, on the fly processing. In some aspects, the number of stored semantic entities may be mainly affected by three aspects—the scale of the domain insights, the length of the historical tracing window (w), and the amount of input event streams. Accordingly, at 405 the amount of loaded events in a given time interval depends on the capability of hardware system and also the factors of temporal window w and size of domain insights.

Continuing to operation 410, an event aggregation operation is performed. The loaded semantic events are received and aggregated by their context. As a further information uplift, the semantic aggregation process reviews all events loaded from different domains currently in the entity pool to ensure the combination of same events and correlated relative events. The aggregation is based, in part, on the historical tracing window w. As such, events that occur within the same specified time window are aggregated.

At operation 415, the performance of the call rules engine (e.g., 135) is invoked. The temporal rules engine is triggered when new events are loaded into the data store. The rules engine is further invoked to inspect all events in the data store again and performs the temporal processing if there is a temporal relationship between events as the events in the event stream are processed and referenced in the domain insights. The rules engine applies the expertise captured in the specified semantic rules of the domain insights (e.g., FIG. 3) and makes a determination in accordance with the specified logical expressions at operation 420. As introduced earlier, the temporal processing herein has the capability of interpreting heterogeneous domain insights by rephrasing the logical representation into semantic expression (e.g., Semantic Web Rule Language, SWRL rules). The temporal processor herein operates to inspect the related domain insight(s) with its SWRL rules and then retrieves the referenced events stored in the data store. In the instance the events exist, then temporal processing is performed in accordance with the specified semantic rules. In some aspects, the processing may be implemented by the semantic rules engine, Jena, or the like.

At operation 425, the processed events, now possibly including newly generated events, are saved back to the data store. It is noted that the new events are stored with a corresponding timestamp with current time.

For a given time interval, the operations 415-425 may continue to be repeated until no additional temporal processing rules are triggered by, for example, new events in an event stream and/or events triggered by the processing of other events. In some aspects, if the processing of an event exceeds the specified time interval, then the event read operation 405 may still process the event but the newly loaded event will not be used in a current processing until all current events are processed. Also, a process delayed auditing event will be triggered and saved into the data store to indicate the state of the processing of the event.

Continuing to operation 430, it is seen that after the processing by the temporal rules engine, the result event(s) will be dispatched as an output event stream. In some embodiments, a copy of these output events may be kept in the data store until the window for historical event tracking is exceed. In this manner, these results may be retrieved for processing and used by other event processing tasks, if need be.

Figure 5:
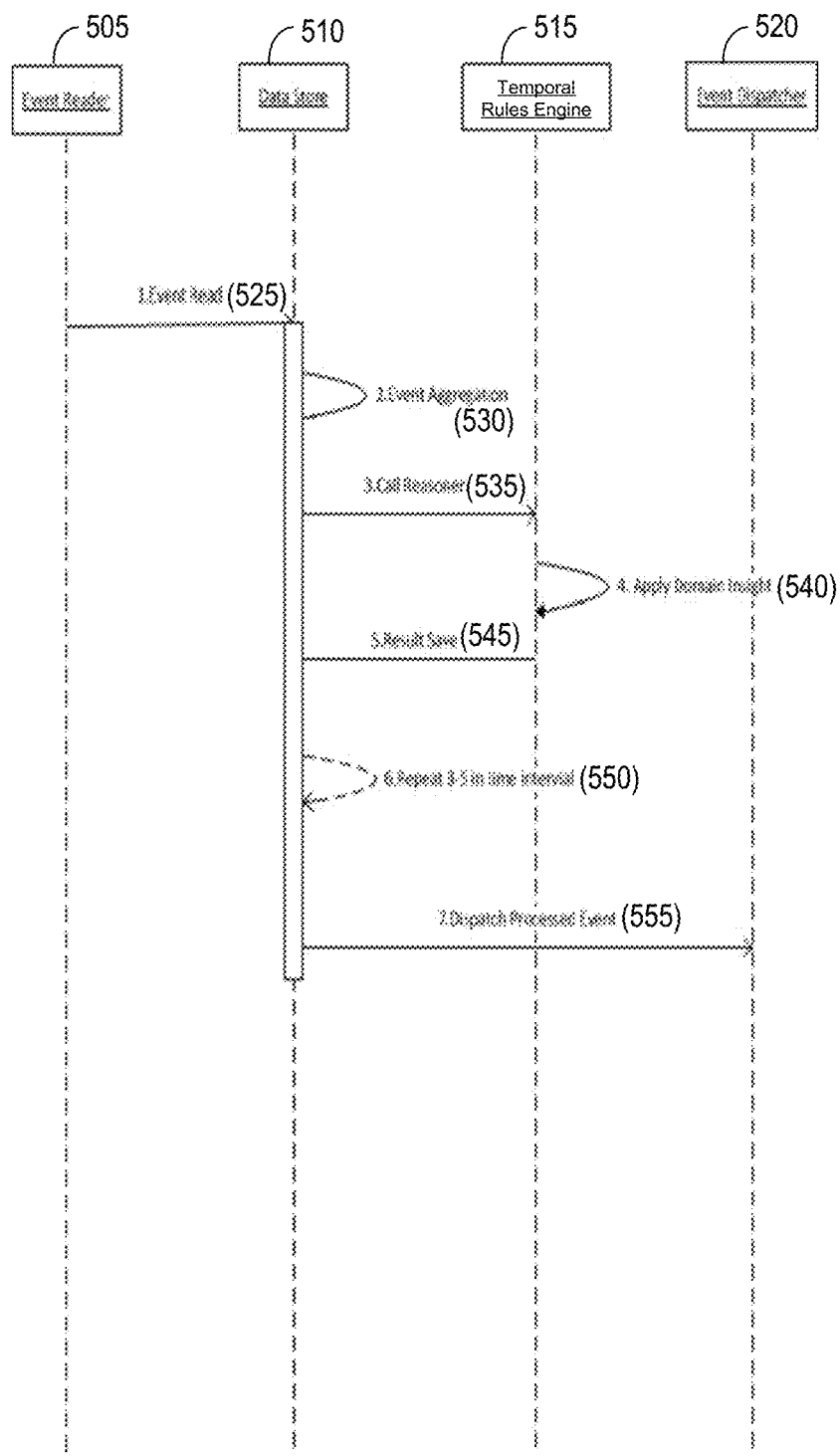
FIG. 5 is a swim lane diagram of a process, according to some embodiments.

FIG. 5 is a swimlane representation of a process according to some embodiments herein. In some aspects, FIG. 5 corresponds to the flow diagram of FIG. 4. Accordingly, details of the operations of FIG. 5 may be had by referring to the discussion of FIG. 4 and are not repeated. Process 500 illustrates the functions of an event reader 505, a data store 510, a temporal rules engine 515, and an event dispatcher 520. As shown, event reader 505 reads an event of an event stream at 525. The events thus received are stored in data store 510 for later retrieval and review. The data store (i.e., in-memory database instance) aggregates the event data at operation 530. At some point 535, a call is made to temporal rules engine 515. The temporal rules engine applies the semantic rules specified by the domain expert to determine the temporal results at 540. At 545, the temporal results are saved by the data store 510. Operations 540-550 may be repeatedly (iteratively) performed for a specified time interval and/or other event(s) dictate, as indicated at 550. At operation 555, the data store (i.e., in-memory database instance) may transmit the finalized temporal processing results to the event dispatcher 520. The event dispatcher may send and present the results in a report, file, message, or analysis.

Figure 6:
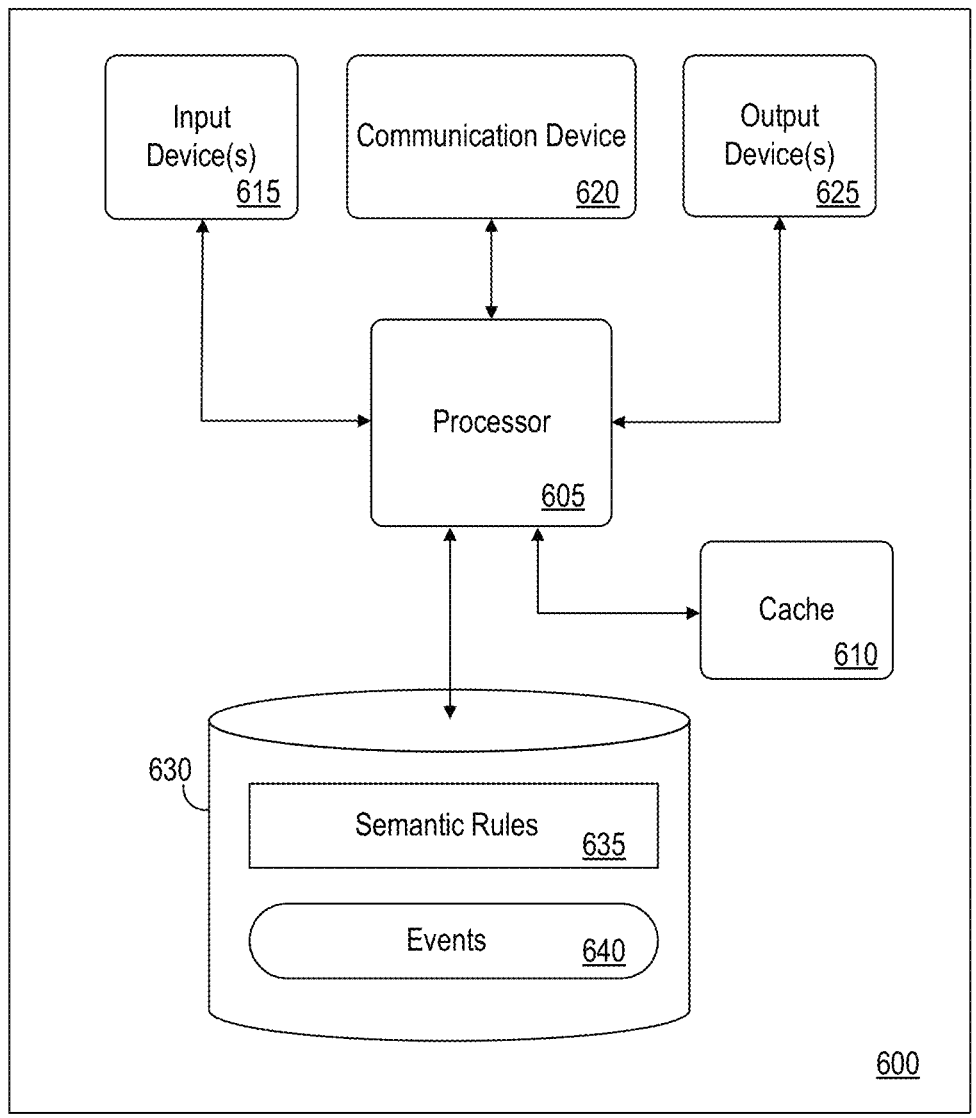
FIG. 6 is a block diagram of a computing device, in accordance with some embodiments.

FIG. 6 is a block diagram overview of a system or apparatus 600 according to some embodiments. System 600 may be, for example, associated with any of the devices described herein, including for example a platform of FIG. 1 and aspects thereof. System 600 comprises a processor 605, such as one or more commercially available Central Processing Units (CPUs) in the form of one-chip microprocessors or a multi-core processor, coupled to a communication device 620 configured to communicate via a communication network (not shown in FIG. 6) to another device or system. In the instance system 600 comprises a device or system (e.g., supporting a real-time semantic rule-based temporal processing platform), communication device 620 may provide a mechanism for system 600 to interface with a monitored entity (e.g., an application, device, system, or service). System 600 may also include a cache 610, such as RAM memory modules. The system further includes an input device 615 (e.g., a touchscreen, mouse and/or keyboard to enter content) and an output device 625 (e.g., a touchscreen, a computer monitor to display, a LCD display).

Processor 605 communicates with a storage device 630. Storage device 630 may comprise any appropriate information storage device, including combinations of magnetic storage devices (e.g., a hard disk drive), optical storage devices, solid state drives, and/or semiconductor memory devices. In some embodiments, storage device 630 may comprise a database system, including in some configurations an in-memory database.

Storage device 630 may store program code or semantic rules 635 that may provide computer executable instructions for implementing processes herein. Processor 605 may perform the instructions of the program instructions 635 to thereby operate in accordance with any of the embodiments described herein. Program instructions 635 may be stored in a compressed, uncompiled and/or encrypted format. Program instructions 635 may furthermore include other program elements, such as an operating system, a database management system, and/or device drivers used by the processor 605 to interface with, for example, peripheral devices (not shown in FIG. 6). Storage device 630 may also include data 640 such as stored events disclosed in some embodiments herein. Data 640 may be used by system 600, in some aspects, in performing one or more of the processes herein, including individual processes, individual operations of those processes, and combinations of the individual processes and the individual process operations.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

Although embodiments have been described with respect to cloud-based entities, note that embodiments may be associated with other types of entities that need not be cloud-based, either in part or whole without any loss of generality.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   receiving an event stream, the event stream comprising a plurality of events, the events being semantically modeled using Resource Description Framework (RDF) specification;
   receiving domain insights specifying a relationship between a first event and a second event of the plurality of events, the domain insights being semantically modeled using RDF specification and comprising a specified time limit and a comparison of a start time or an end time of the first event and a start time or an end time of the second event using a combination of the specified time limit with a logical operator;
   retrieving stored representations of events referenced in the received domain insights;
   processing the event stream, the received domain insights, and the retrieved stored representations of events to produce a temporal processing result;
   storing the temporal processing result; and
   dispatching the temporal processing result, wherein the dispatched temporal processing result is used for at least one of guidance in a business process and producing a business report.

2. The method of claim 1, wherein the temporal relationship specified by the received domain insights includes at least one of an uncertain beginning and an uncertain ending for at least one event.

3. The method of claim 1, wherein the semantically modeled events in the received event stream are defined based on a series of semantically modeled occurrences.

4. The method of claim 1, wherein the received domain insights are defined based on three operators including a DURING operator, an AFTER operator specifying the time limit, and a FILTER operator specifying the time limit.

5. The method of claim 1, further comprising associating a uniquely identifiable identifier with the temporal processing result.

6. The method of claim 1, wherein the retrieving of the stored events and the storing of the temporal processing result is performed by an instance of an in-memory database system.

7. The method of claim 1, wherein the receiving of the domain insights, the retrieving of the stored events, the processing the event stream, and the storing of the temporal processing result is repeated for at least one of a specified time interval and until an exhaustion of temporal event generation.

8. A non-transitory medium storing processor-executable program instructions, the program instructions executable by a computer to:
receive an event stream, the event stream comprising a plurality of events, the events being semantically modeled using Resource Description Framework (RDF) specification;
receive domain insights specifying a relationship between a first event and a second event of the plurality of events, the domain insights being semantically modeled using RDF specification and comprising a specified time limit and a comparison of a start time or an end time of the first event and a start time or an end time of the second event using a combination of the specified time limit with a logical operator;
retrieve stored representations of events referenced in the received domain insights;
process the event stream, the received domain insights, and the retrieved stored representations of events to produce a temporal processing result;
store the temporal processing result; and
dispatching the temporal processing result, wherein the dispatched temporal processing result is used for at least one of guidance in a business process and producing a business report.

9. The medium of claim 8, wherein the temporal relationship specified by the received domain insights includes at least one of an uncertain beginning and an uncertain ending for at least one event.

10. The medium of claim 8, wherein the semantically modeled events in the received event stream are defined based on a series of semantically modeled occurrences.

11. The medium of claim 8, wherein the received domain insights are defined based on three operators including a DURING operator, an AFTER operator specifying the time limit, and a FILTER operator specifying the time limit.

12. The medium of claim 8, further comprising associating a uniquely identifiable identifier with the temporal processing result.

13. The medium of claim 8, wherein the retrieving of the stored events and the storing of the temporal processing result is performed by an instance of an in-memory database system.

14. The medium of claim 8, wherein the receiving of the domain insights, the retrieving of the stored events, the processing the event stream, and the storing of the temporal processing result is repeated for at least one of a specified time interval and until an exhaustion of temporal event generation.

15. A system comprising;
a computing device comprising;
a memory storing processor-executable program instructions; and
a processor to execute the processor-executable program instructions to cause the computing device to:
receive an event stream, the event stream comprising a plurality of events, the events being semantically modeled using Resource Description Framework (RDF) specification;
receive domain insights specifying a relationship between a first event and a second event of the plurality of events, the domain insights being semantically modeled using RDF specification and comprising a specified time limit and a comparison of a start time or an end time of the first event and a start time or an end time of the second event using a combination of the specified time limit with a logical operator;
retrieve stored representations of events referenced in the received domain insights;
process the event stream, the received domain insights, and the retrieved stored representations of events to produce a temporal processing result;
store the temporal processing result; and
dispatching the temporal processing result, wherein the dispatched temporal processing result is used for at least one of audience in a business process and producing a business report.

16. The system of claim 15, wherein the temporal relationship specified by the received domain insights includes at least one of an uncertain beginning and an uncertain ending for at least one event.

17. The system of claim 15, wherein the received domain insights are defined based on three operators including a DURING operator, an AFTER operator specifying the time limit, and a FILTER operator specifying the time limit.

18. The system of claim 15, further comprising associating a uniquely identifiable identifier with the temporal processing result.

19. The system of claim 15, wherein the retrieving of the stored events and the storing of the temporal processing result is performed by an instance of an in-memory database system.

20. The system of claim 15, wherein the receiving of the domain insights, the retrieving of the stored events, the processing the event stream, and the storing of the temporal processing result is repeated for at least one of a specified time interval and until an exhaustion of temporal event generation.

* * * * *